US012454638B2

(12) United States Patent
Daeffler et al.

(10) Patent No.: US 12,454,638 B2
(45) Date of Patent: Oct. 28, 2025

(54) DRILLING FLUIDS INCLUDING A VISCOSIFIER, AND RELATED METHODS

(71) Applicant: Schlumberger Technology Corporation, Sugar Land, TX (US)

(72) Inventors: Kristina Daeffler, Sugar Land, TX (US); Linus Sebelin, Houston, TX (US); Balakrishnan Panamarathupalayam, Houston, TX (US)

(73) Assignee: Schlumberger Technology Corporation, Sugar Land, TX (US)

( * ) Notice: Subject to any disclaimer, the term of this patent is extended or adjusted under 35 U.S.C. 154(b) by 0 days.

(21) Appl. No.: 18/525,132

(22) Filed: Nov. 30, 2023

(65) Prior Publication Data

US 2025/0179342 A1 Jun. 5, 2025

(51) Int. Cl.
*C09K 8/24* (2006.01)
*E21B 21/00* (2006.01)

(52) U.S. Cl.
CPC .............. *C09K 8/24* (2013.01); *E21B 21/003* (2013.01)

(58) Field of Classification Search
CPC ... E21B 21/00; E21B 7/00; E21B 7/18; E21B 21/002; E21B 21/003; E21B 21/14; C09K 8/24; C09K 8/04; C09K 8/02
See application file for complete search history.

(56) References Cited

U.S. PATENT DOCUMENTS

| 6,715,568 | B1 | 4/2004 | Bailey |
| 9,896,610 | B2 | 2/2018 | Young et al. |
| 2005/0256012 | A1* | 11/2005 | Smith ................. C09K 8/5083 507/120 |
| 2020/0255716 | A1 | 8/2020 | Favero |

FOREIGN PATENT DOCUMENTS

| CN | 105713587 A | | 6/2016 |
| WO | 2001004232 A1 | | 1/2001 |
| WO | WO 2015/065575 | * | 5/2015 |
| WO | 2024233340 A | | 11/2024 |

* cited by examiner

*Primary Examiner* — Zakiya W Bates
(74) *Attorney, Agent, or Firm* — Jeffrey D. Frantz

(57) ABSTRACT

A drilling fluid for drilling a subterranean wellbore includes water, salt, and a viscosifier comprising a first component comprising a reaction product of at least one acrylamide monomer and at least one sulfonated anionic monomer, and a second component comprising styrene-butadiene polymer. Related methods of operating a wellbore and drilling fluids are claimed.

20 Claims, 2 Drawing Sheets

DRILLING FLUIDS INCLUDING A VISCOSIFIER, AND RELATED METHODS

CROSS-REFERENCE TO RELATED APPLICATIONS

N/A

BACKGROUND OF THE DISCLOSURE

Wellbore drilling operations includes drilling a bore in a formation to access reservoirs of hydrocarbons and other subsurface resources. During drilling of a wellbore, various fluids may be circulated through a drill pipe and drill bit and into the wellbore and may subsequently flow upward through the wellbore to the surface. For example, a drilling fluid (e.g., an aqueous-based fluid, such as drilling mud) may be pumped down the inside of the drill pipe, through the drill bit, and into the wellbore. The drilling fluid returns to the surface through the annulus. The drilling fluid may lubricate and cool the drill bit and facilitate removal of formation cuttings. Maintaining a sufficiently high viscosity of the drilling fluid may facilitate providing sufficient suspension and removal of cuttings by the drilling fluid.

In some instances, undesirable formation conditions may result in the loss of wellbore fluids to the formation. For example, wellbore fluids may leave the borehole through fissures and/or fractures in the formation or through a porous formation material (e.g., a porous rock matrix) surrounding the borehole. To reduce loss of the drilling fluids, the drilling fluid may include one or more fluid loss agents, such as xanthan gum or hydroxyethyl cellulose (HEC).

Conventionally, the viscosity of the drilling fluid may be increased with a viscosifier (also referred to as a "thickener"), such as xanthan gum. The higher temperatures encountered downhole and the presence of ions in the drilling fluid may reduce the effectiveness of such viscosifiers. In addition, the drilling fluid may facilitate formation of a filtercake on surfaces of the formation to reduce or prevent permeation of fluids from entering the surrounding formation. However, some filtercakes fail prematurely due to conditions within the formation and wellbore.

In addition to preventing the drilling fluid from entering the formation, the drilling fluids are formulated to have a density sufficient to keep drilling fluids from entering the wellbore during the drilling operation. For example, the drilling fluids may include weighting agents and salts to increase the density of the drilling fluid. However, the high concentration of the salts may reduce the stability and the effectiveness of the viscosifiers.

SUMMARY

In some embodiments, a drilling fluid comprises water, salt, and a viscosifier compromising a first component and a second component. The first component comprises a reaction product of at least one acrylamide monomer and at least one sulfonated anionic monomer, and the second component comprises styrene-butadiene polymer.

In some embodiments, a drilling fluid comprises a base fluid comprising brine, and a viscosifier comprising a first component comprising a reaction product of N,N-dimethylacrylamide and 2-acrylamido-2-methyl-propanesulfonic acid, and a second component comprising styrene-butadiene rubber.

In some embodiments, a method of operating a wellbore comprises pumping a drilling fluid into a wellbore extending through an earth formation, and operating a drill bit while pumping the drilling fluid in the wellbore. The drilling fluid comprises a base fluid, and a viscosifier comprising a first component comprising a reaction product of at least one acrylamide monomer and at least one sulfonated anionic monomer, and a second component comprising styrene-butadiene rubber.

BRIEF DESCRIPTION OF THE DRAWINGS

In order to describe the manner in which the above-recited and other features of the disclosure can be obtained, a more particular description will be rendered by reference to specific embodiments thereof which are illustrated in the appended drawings. For better understanding, the like elements have been designated by like reference numbers throughout the various accompanying figures. While some of the drawings may be schematic or exaggerated representations of concepts, at least some of the drawings may be drawn to scale. Understanding that the drawings depict some example embodiments, the embodiments will be described and explained with additional specificity and detail through the use of the accompanying drawings in which.

DETAILED DESCRIPTION

This disclosure generally relates to devices, systems, and methods for wellbore fluid additives for downhole applications, such as mitigation of fluid loss and maintenance of fluid viscosity. The fluid additive may be used in a wellbore fluid, such as a drilling fluid, or drill-in fluids (also referred to as "reservoir drill-in fluids" (RDF)). The fluid additive may be referred to herein as a "viscosifier," a "fluid loss additive," or a "fluid loss control agent." The viscosifier may include a first component and at least a second component. The first component may include a reaction product of at least one acrylamide monomer and at least one sulfonated anionic monomer. The second component may include a latex material. In some embodiments, the second component comprises styrene-butadiene rubber (SBR). Since the second component includes a latex, the second component may also be referred to herein as a latex component. In some embodiments, the viscosifier includes a greater weight percent of the second component than the first component.

The second component may facilitate improved rheological properties of the drilling fluid including the viscosifier, even in relatively high salinity drilling fluids and may be suitable for use in high temperature high pressure (HTHP) applications. In some embodiments, the viscosifier may be stable at earth formation temperatures greater than about 148.9° C. (about 300° F.), such as greater than about 176.7° C. (about 350° F.), greater than about 204° C. (about 400° F.), or even greater than about 232° C. (about 450° F.). Without being bound by any particular theory, it is believed that the first component facilitates stability of the viscosifier at HTHP conditions, and the second component facilitates improved rheological properties of the viscosifier at the HTHP conditions and at relatively high salinity levels.

The viscosifier may increase the viscosity of the wellbore fluid, facilitating efficient cuttings lifting during drilling operations. In addition, the viscosifier may induce formation of a filtercake between the drill string or casing and the walls of the formation. The filtercake may reduce or prevent loss of the drilling fluid into the formation, such as by permeation, preserving the integrity of the formation. In addition, after the drilling operation is complete, the viscosifier and the filtercake may be removed (e.g., broken) to facilitate completion operations. For example, one or more groups (e.g., crosslinker groups) of the filtercake may be broken responsive to exposure to a breaker fluid, facilitating removal of the filtercake and completion of the wellbore.

Figure 1:
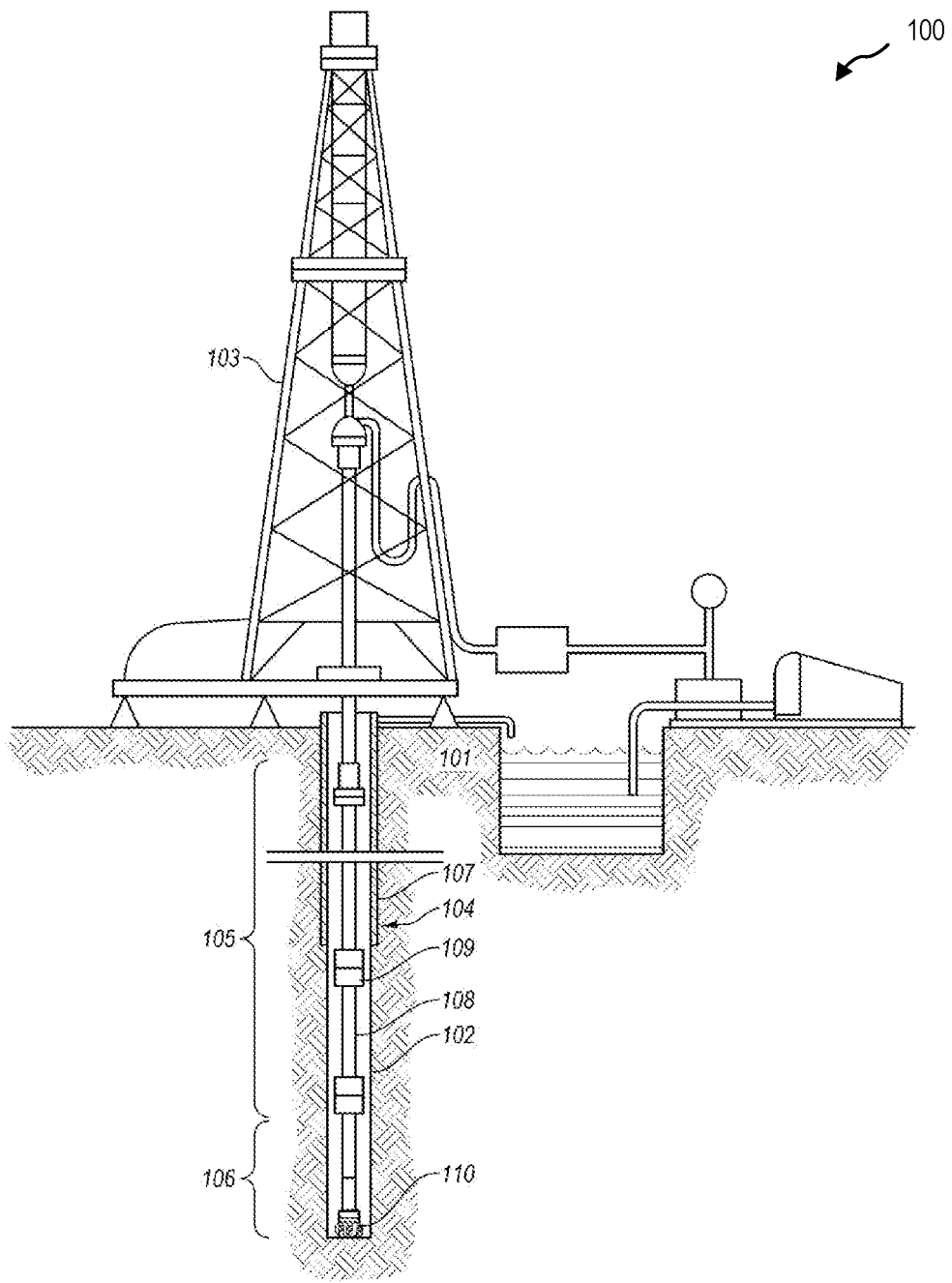
FIG. 1 is a representation of a drilling system for drilling an earth formation to form a wellbore, according to at least one embodiment of the present disclosure.

FIG. 1 shows one example of a drilling system 100 for drilling an earth formation 101 to form a wellbore 102. The drilling system 100 includes a drill rig 103 used to turn a drilling tool assembly 104 which extends downward into the wellbore 102. The drilling tool assembly 104 may include a drill string 105, a bottomhole assembly ("BHA") 106, and a bit 110, attached to the downhole end of drill string 105.

The drill string 105 may include several joints of drill pipe 108 connected end-to-end through tool joints 109. The drill string 105 transmits drilling fluid through a central bore and transmits rotational power from the drill rig 103 to the BHA 106. In some embodiments, the drill string 105 may further include additional components such as subs, pup joints, etc. The drill pipe 108 provides a hydraulic passage through which drilling fluid is pumped from the surface. The drilling fluid discharges through selected-size nozzles, jets, or other orifices in the bit 110 for the purposes of cooling the bit 110 and cutting structures thereon, and for lifting cuttings out of the wellbore 102 as it is being drilled.

The BHA 106 may include the bit 110 or other components. An example BHA 106 may include additional or other components (e.g., coupled between to the drill string 105 and the bit 110). Examples of additional BHA components include drill collars, stabilizers, measurement-while-drilling ("MWD") tools, logging-while-drilling ("LWD") tools, downhole motors, underreamers, section mills, hydraulic disconnects, jars, vibration or dampening tools, other components, or combinations of the foregoing. The BHA 106 may further include a rotary steerable system (RSS). The RSS may include directional drilling tools that change a direction of the bit 110, and thereby the trajectory of the wellbore. At least a portion of the RSS may maintain a geostationary position relative to an absolute reference frame, such as gravity, magnetic north, and/or true north. Using measurements obtained with the geostationary position, the RSS may locate the bit 110, change the course of the bit 110, and direct the directional drilling tools on a projected trajectory.

In general, the drilling system 100 may include other drilling components and accessories, such as special valves (e.g., kelly cocks, blowout preventers, and safety valves). Additional components included in the drilling system 100 may be considered a part of the drilling tool assembly 104, the drill string 105, or a part of the BHA 106 depending on their locations in the drilling system 100.

The bit 110 in the BHA 106 may be any type of bit suitable for degrading downhole materials. For instance, the bit 110 may be a drill bit suitable for drilling the earth formation 101. Example types of drill bits used for drilling earth formations are fixed-cutter or drag bits. In other embodiments, the bit 110 may be a mill used for removing metal, composite, elastomer, other materials downhole, or combinations thereof. For instance, the bit 110 may be used with a whipstock to mill into casing 107 lining the wellbore 102. The bit 110 may also be a junk mill used to mill away tools, plugs, cement, other materials within the wellbore 102, or combinations thereof. Swarf or other cuttings formed by use of a mill may be lifted to surface, or may be allowed to fall downhole.

In some embodiments, during drilling operations, a drilling fluid may be used to facilitate lubrication and cooling of the bit 110 and removal of earth formation 101 cuttings. The drilling fluid may include one or more additives to impart one or more properties on the drilling fluid. For example, the drilling fluid may include a viscosifier formulated and configured to increase a viscosity of the drilling fluid and form a filtercake on walls of the earth formation 101 defining the wellbore 102.

The drilling fluid may include a base fluid, the viscosifier, and one or more additional additives (e.g., thinners, weighting agents, gelling materials, shale inhibitors, pH buffers, defoamers, rheological additives formulated to improve the rheological properties of the drilling fluid, etc.). In some embodiments, the drilling fluid comprises an aqueous-based drilling fluid and may be referred to as a "drilling mud." The base fluid may include water, sea water, brine, or a salt-containing aqueous solution. By way of non-limiting example, the base fluid may include a brine including water and one or more salts (e.g., one or more organic salts and/or one or more inorganic salts).

The one or more salts may provide a desired density to the drilling fluid and may also reduce the effect of the drilling fluid on hydratable clays and shales the earth formation 101. The salts may include salts of one or more of sodium, calcium, aluminum, magnesium, zinc, potassium, strontium, or lithium, and salts of one or more of chlorides, bromides, carbonates, iodides, chlorates, bromates, formates, nitrates, oxides, phosphates, sulfates, silicates, or fluorides. In some embodiments, the salt comprises a divalent halide, such as an alkaline earth halide (e.g., calcium chloride ($CaCl_2$)), calcium bromide ($CaBr_2$)), or a zinc halide. The salt may include cesium formate (HCOOR), sodium bromide (NaBr), potassium bromide (KBr), and cesium bromide (CsBr). In other embodiments, the salt comprises a monovalent halide, such as at least one of sodium chloride, sodium bromide, or potassium chloride. The particular composition of the salt may be selected based on compatibility with the earth formation 101 and/or to match the brine phase of the completion fluid.

In some embodiments, the weight percent of the salt may be greater than the weight percent of the water in the base fluid. In other embodiments, the weight percent of the salt is less than the weight percent of the water in the base fluid. In some embodiments, the base fluid includes a brine having a relatively higher salinity compared to conventional brines used in drilling fluids. For example, in some embodiments, a concentration of the salt in the brine may be at least about 20 weight percent, such as at least about 30 weight percent, at least about 40 weight percent, or even at least about 50 weight percent of the brine. As described in additional detail herein, the viscosifier including the first component and the second component may be stable in such high salinity brines, even at HTHP conditions, such as at temperatures up to about 176.7° C. (about 400° F.), such as at temperatures up to about 204.4° C. (about 400° F.).

As described above, the viscosifier may be formulated and configured to increase the viscosity of the drilling fluid, and to facilitate formation of a filtercake between the earth formation 101 and one or more of (e.g., each of) the drill string 105, casing 107, and liners. The viscosifier may include at least a first component and at least a second component. In some embodiments, each of the first component and the second component are individually dispersed within the drilling fluid. For example, the first component and the second component may individually comprise a discontinuous phase in a continuous aqueous phase.

The first component may include a crosslinked polymeric material comprising a polymer (e.g., a copolymer) formed from at least one acrylamide monomer and at least one sulfonated anionic monomer. In other words, the first component may include a reaction product of the at least one acrylamide monomer and at least one sulfonated anionic monomer. In other embodiments, the first component comprises a higher order copolymer and/or block copolymers, such as a terpolymer, a quaternary polymer, or another higher order polymer including the at least one acrylamide monomer and the at least one sulfonated anionic monomer.

The polymer of the first component may include at least one monomeric unit (monomer units) comprising the monomers used to form the polymer. By way of non-limiting example, where the polymer comprises a copolymer of the reaction product of at least one acrylamide monomer and at least one sulfonated anionic monomer, the polymer includes first monomeric units of the at least one acrylamide monomer and second monomeric units of the at least one sulfonated anionic monomer.

The at least one acrylamide monomer may include one or more of acrylamide, unsubstituted acrylamide, methacrylamide, N-substituted acrylamides (e.g., alkylacrylamides, N-methylolacrylamide, N-isopropylacrylaminde, diacetone acrylamide, N-alkyl acrylamide (where alkyl is $C_1$ to $C_{14}$), and N,N-dialkyl acrylamides (where the alkyl is $C_1$ (e.g., N,N-dimethylacrylamide) to $C_{14}$), N-cycloalkane, N-(2-hydroxyethyl) acrylamide, N-isopropyl acrylamide, N-[3-(dimethylamino)propyl]acrylamide, or acryloyl morpholine). In embodiments wherein the at least one acrylamide monomer comprises an N-substituted acrylamide, the N-substituted acrylamide may comprise N,N-dialkyl acrylamides (e.g., N,N-dimethylacrylamide). The alkyl groups of the N,N-dialkyl acrylamides may be linear, branched, or cyclic. In some embodiments, the at least one acrylamide monomer comprises N,N-dimethylacrylamide.

In some embodiments, a mole percent of the at least one acrylamide monomer in the first component may be within a range of from about 0.1 mole percent to about 50.0 mole percent of the first component, such as within a range of from about 0.1 mole percent to about 10.0 mole percent, from about 10.0 mole percent to about 20.0 mole percent, from about 20.0 mole percent to about 30.0 mole percent, from about 30.0 mole percent to about 40.0 mole percent, or from about 40.0 mole percent to about 50.0 mole percent of the first component.

The at least one sulfonated anionic monomer may include one or more of 2-acrylamido-2-methyl-propanesulfonic acid (AMPS®), a trademark of the Lubrizol Corporation (also referred to as acrylamide tertiary butyl sulfonic acid (ATBS)), vinyl sulfonates, styrene sulfonic acid, allyl sulfonates, or styrene sulfonic acid. The at least one sulfonated anionic monomer may facilitate tolerance of the viscosifier to divalent cations in the drilling fluid brine, such as calcium and magnesium. In some embodiments, the at least one sulfonated anionic monomer is provided as a salt, such as an ammonium salt. For example, the at least one sulfonated anionic monomer may be provided as an ammonium salt of 2-acrylamido-2-methyl-propanesulfonic acid or a sodium salt of 2-acrylamido-2-methyl-propanesulfonic acid.

In some embodiments, a mole percent of the at least one sulfonated anionic monomer in the first component may be within a range of from about 50.0 mole percent to about 99.0 mole percent of the first component, such as within a range of from about 50.0 mole percent to about 60.0 mole percent, from about 60.0 mole percent to about 70.0 mole percent, from about 70.0 mole percent to about 80.0 mole percent, or from about 80.0 mole percent to about 99.0 mole percent of the first component. A mole percent of the at least one sulfonated anionic monomer in the first component may be greater than a mole percent of the at least one acrylamide monomer in the first component.

In some embodiments, a molar ratio of the acrylamide monomer to the sulfonated anionic monomer may be within a range of from about 1.0:1.0 to about 1.0:100.0, such as from about 1.0:1.0 to about 1.0:5.0, from about 1.0:5.0 to about 1.0:10.0, from about 1.0:10.0 to about 1.0:25.0, from about 1.0:25.0 to about 1.0:50.0, from about 1.0:50.0 to about 1.0:75.0, or from about 1.0:75.0 to about 1.0:100.0.

In addition to the at least one acrylamide monomer and the at least one sulfonated anionic monomer, the first component of the viscosifier may further include one or more additional monomers. For example, the first component may further include one or more of lipophilic monomers, such as isobornyl methacrylate, 2-ethyl hexyl acrylate, N-alkyl and N,N-dialkyl acrylamide, or styrene. In addition, the first component may further include one or more anionic monomers, such as maelic acid, tetrahydrophtalic acid, fumaric acid, or acrylic acid, which may be incorporated into the polymer formed from the at least one sulfonated anionic monomer and the at least one sulfonated anionic monomer.

The first component may comprise an amphoteric material (e.g., a material formulated to act as either an acid or a base). In some embodiments, the first component comprises a water-soluble branched sulfonated amphoteric polymer and includes at least a N,N-dialkylacrylamide monomer (e.g., N,N-dimethylacrylamide), and a sulfonic acid-containing monomer (e.g., 2-acrylamido-2-methyl-propanesulfonic acid).

In some embodiments, the first component further includes a branching agent. The branching agent may include a tetraallyl ammonium halide, such as tetraallyl ammonium chloride. The branching agent may constitute from about 0.1 weight percent to about 5.0 weight percent of the first component, such as from about 0.1 weight percent to about 0.5 weight percent, from about 0.5 weight percent to about 1.0 weight percent, from about 1.0 weight percent to about 2.0 weight percent, from about 2.0 weight percent to about 3.0 weight percent, or from about 3.0 weight percent to about 5.0 weight percent of the first component.

In some embodiments, the first component may further include one or more crosslinkers. The amount of crosslinking of the first component polymer may be selected based on the desired viscosity of the viscosifier including the first component. The crosslinker may include one or more crosslinker monomers, such as methylenebisacrylamide, divinyl benzene, allyl methacrylate, tetra allyloxethane, or other allylic bifunctional monomers. The crosslinkers may facilitate between about 0.25% and about 10% of intermolecular crosslinking of the polymer of the first component.

In some embodiments, the first component includes a reaction product of N,N-dimethylacrylamide and 2-acrylamido-2-methyl-propanesulfonic acid. The reaction product may further include at least one branching agent, such as tetraallyl ammonium chloride (TAAC). In some embodiments, the reaction product may further include at least one crosslinker.

The first component may constitute from about 40 weight percent to about 80 weight percent of the viscosifier, such as from about 40 weight percent to about 50 weight percent, from about 50 weight percent to about 60 weight percent, from about 60 weight percent to about 70 weight percent, or from about 70 weight percent to about 80 weight percent of the viscosifier. In some embodiments, the first component comprises about 60 weight percent of the viscosifier. However, the disclosure is not so limited, and the first component may constitute a different weight percent of the viscosifier.

The second component of the viscosifier may include a latex material. The latex material may include one or more of styrene-butadiene rubber (SBR), such as styrene-butadiene polymer. The styrene-butadiene may include SBR copolymer (formed from monomer units of styrene and butadiene), styrene-butadiene terpolymer including monomer units of styrene, butadiene, and one or more other monomers (e.g., one or more of acrylate, methacrylate, polyurethanes, copolymerized isoprene), or styrene-butadiene polymer formed from styrene, butadiene, and at least two additional types of monomeric units. In some embodiments, the second component comprises SBR copolymer.

A molar percent of the styrene in the styrene-butadiene may be within a range of from about 10 mole percent to about 50 mole percent, such as from about 10 mole percent to about 20 mole percent, from about 20 mole percent to about 30 mole percent, from about 30 mole percent to about 40 mole percent, or from about 40 mole percent to about 50 mole percent. In some embodiments, a mole percent of the styrene in the styrene-butadiene is less than a mole percent of the butadiene in the styrene-butadiene. In some embodiments, a mole percent of the styrene in the styrene-butadiene is about 25 mole percent. In some embodiments, a mole percent of the styrene in the styrene-butadiene is less than about 20 mole percent.

A molar percent of the butadiene in the styrene-butadiene may be within a range of from about 50 mole percent to about 90 mole percent, such as from about 50 mole percent to about 60 mole percent, from about 60 mole percent to about 70 mole percent, from about 70 mole percent to about 80 mole percent, or from about 80 mole percent to about 90 mole percent. In some embodiments, a mole percent of the butadiene in the second component may be greater than a mole percent of the styrene. In some embodiments, a mole percent of the styrene in the styrene-butadiene may be about 75 mole percent. In some embodiments, a mole percent of the butadiene in the second component is greater than about 80 mole percent.

A ratio (e.g., a molar ratio) of the butadiene to the styrene in the second component may be within a range of from about 1.0:1.0 to about 5.0:1.0, such as from about 1.0:1.0 to about 1.0:2.0, from about 1.0:2.0 to about 1.0:3.0, from about 1.0:3.0 to about 1.0:4.0, or from about 1.0:4.0 to about 1.0:5.0.

In some embodiments, the second component is surfactant stabilized. In some such embodiments, the second component includes at least one surfactant to facilitate dispersibility of the second component in the drilling fluid (e.g., in aqueous fluids). For example, the surfactant may be present at an interface between the second component and the continuous phase of the base fluid (e.g., brine). The surfactant may include one or more of sodium dodecyl sulfate (SDS), sodium 1,4-bis[(2-ethylhexyl)oxy]-1,4-dioxobutane-2-sulfonate (sold under the tradename Aerosol OT (AOT)), polymeric surfactants (e.g., a mixture of 30% ammonium salt of sulfated ethoxylated nonylphenols), or nonionic surfactants (e.g., octylphenol polyether alcohol, alkylaryl polyether alcohols, polyoxyethylene-polyoxypropylene block copolymer).

The surfactant may be constitute from about 0.1 weight percent to about 10.0 weight percent of the second component, such as from about 0.1 weight percent to about 0.5 weight percent, from about 0.5 weight percent to about 1.0 weight percent, from about 1.0 weight percent to about 3.0 weight percent, from about 3.0 weight percent to about 5.0 weight percent, or from about 5.0 weight percent to about 10.0 weight percent of the second component.

The second component may constitute from about 20 weight percent to about 60 weight percent of the viscosifier, such as from about 20 weight percent to about 30 weight percent, from about 30 weight percent to about 40 weight percent, from about 40 weight percent to about 50 weight percent, or from about 50 weight percent to about 60 weight percent of the viscosifier. In some embodiments, the second component constitutes a lower weight percent of the viscosifier than the first component. In some embodiments, the second component constitutes about 40 weight percent of the viscosifier. However, the disclosure is not so limited, and the second component may constitute a different weight percent of the viscosifier.

The viscosifier may include a lower weight percent of the second component than the first component. A ratio (e.g., a weight) of the first component to the second component may be within a range of from about 0.67:1.0 to about 4.0:1.0, such as from about 0.67:1.0 to about 1.0:1.0, from about 1.0:1.0 to about 2.0:1.0, from about 2.0:1.0 to about 3.0:1.0, or from about 3.0:1.0 to about 4.0:1.0. However, the disclosure is not so limited, and the ratio of the first component to the second component may be different than those described.

The second component may constitute from about 0.5 weight percent to about 9.0 weight percent of the drilling fluid, such as from about 0.5 weight percent to about 1.0 weight percent, from about 1.0 weight percent to about 2.0 weight percent, from about 2.0 weight percent to about 4.0 weight percent, from about 4.0 weight percent to about 6.0 weight percent, or from about 6.0 weight percent to about 9.0 weight percent of the viscosifier. However, the disclosure is not so limited, and the second component may constitute a different weight percent of the viscosifier.

The viscosifier may constitute from about 0.5 weight percent to about 10.0 weight percent of the drilling fluid, such as from about 0.5 weight percent to about 1.0 weight percent, from about 1.0 weight percent to about 2.0 weight percent, from about 2.0 weight percent to about 3.0 weight percent, from about 3.0 weight percent to about 5.0 weight percent, from about 5.0 weight percent to about 7.0 weight percent, or from about 7.0 weight percent to about 10.0 weight percent of the drilling fluid. In some embodiments, the viscosifier constitutes from about 0.5 weight percent to about 6.0 weight percent of the drilling fluid. However, the disclosure is not so limited, and the weight percent of the viscosifier in the drilling fluid may be different than that described.

In some embodiments, the second component further includes one or more additional polymers, such as one or more of polysaccharides, lignins, lignitic materials, or tannins. For example, the second component may further include crosslinked polymers of phenylpropane units, hydrolysable tannins, condensed tannins (e.g., proanthocyanidins), monosaccharides joined together by glycosidic linkages, starch, glycogen, cellulose, locust bean gums, xanthan gums, welan gums, scleroglucan gums, and guar gums. In some embodiments, the second component further includes starch (e.g., potato starch, corn starch, tapioca starch, wheat starch, and rice starch).

The drilling fluid may further include one or more additives selected based on the desired properties of the drilling fluid. As discussed above, and by way of non-limiting example, the one or more additional additives may include one or more of thinners, gelling agents, shale inhibitors, pH buffers, weighing materials, defoamers, rheological additives, or other additives that may be suitable depending on the particular operation.

Wellbore fluid thinners may include lignosulfates, lignitic materials, modified lignosulfonates, polyphosphates, tannin, and polyacrylates. The thinners may facilitate improved rheological properties of the drilling fluid (e.g., a reduction in flow resistance) and a reduction in gel development. In addition, the thinner may reduce a thickness of filtercakes formed by the drilling fluid, counteract the effects of salts, and reduce the effects of water on the earth formation 101.

Weighting materials (also referred to as "weighting agents") may include one or more of barite ($BaSO_4$), iron oxide (e.g., $Fe_2O_3$, $Fe_3O_4$), calcium carbonate ($CaCO_3$), magnesium carbonate ($MgCO_3$), manganese oxide ($Mn_3O_4$), or combinations of thereof. The weighting material may be present in the drilling fluid and facilitate increasing the density of the drilling fluid up to about 2.88 g/cm$^3$ (about 24 pounds per gallon (ppg)).

The pH buffer may include an amine stabilizer, such as one or more of triethanolamine ($C_6H_{15}NO_3$) (TEOA), methyldiethanol amine ($C_5H_{13}NO_2$) (MDEA), dimethylethanol amine ($C_4H_{15}NO_3$) (DMEA), diethanol amine ($C_4H_{11}NO_2$) (DEA), monoethanol amine (MEA), cyclic organic amines, sterically hindered amines, amides of fatty acid, or other suitable tertiary, secondary, and primary amines and ammonia. In some embodiments, the pH buffer includes magnesium oxide.

The gelling agent may include one or more of a clay and a crosslinked polyvinylpyrrolidone, an acrylamide copolymer, guar, sodium bentonite, or another material. The shale inhibitor may include one or more of amine tartaric salt, ammonium lauric salt, polyammonium, alkyl diammonium, an amphoteric polymer, an organosilicate polymer, a silicone polymer, or another material. Defoamers may include one or more of 2-octanol, oleic acid, paraffinic waxes, amide waxes, sulfonated oils, organic phosphates, silicone oils, mineral oils, or dimthylpolysiloxane.

A density of the drilling fluid may be within a range of from about 1,080 kg/m$^3$ to about 2,300 kg/m$^3$, such as from about 1,080 kg/m$^3$ to about 1,200 kg/m$^3$, from about 1,200 kg/m$^3$ to about 1,400 kg/m$^3$, from about 1,400 kg/m$^3$ to about 1,600 kg/m$^3$, from about 1,600 kg/m$^3$ to about 1,800 kg/m$^3$, from about 1,800 kg/m$^3$ to about 2,000 kg/m$^3$, or from about 2,000 kg/m$^3$ to about 2,300 kg/m$^3$. However, the disclosure is not so limited, and the density of the drilling fluid may be different than that described.

In use and operation, the viscosifier may be added to a drilling fluid. The viscosifier may increase the viscosity of the drilling fluid and facilitate formation of a filtercake on walls of the wellbore at wellbore conditions. The filtercake may substantially reduce or prevent infiltration of the formation with drilling fluids. In addition, the viscosifier may facilitate a reduction in the fluid loss of the drilling fluid, such as to porosity of the earth formation 101.

The viscosifier may be suitable for high temperature high pressure applications and have a temperature stability up to about 232° C. (about 450° F.), such as up to about 93.3° C. (about 200° F.), up to about 121.1° C. (about 250° F.), up to about 148.9° C. (about 300° F.), up to about 176.7° C. (about 350° F.), or up to about 204° C. (about 400° F.). In some embodiments, the viscosifier is formulated and configured to be stable up to a temperature of about 140.6° C. (about 285° F.).

After use in a drilling fluid, such as after a drilling operation has been completed, the viscosifier and filtercake may be removed from the wellbore. For example, the viscosifier and the filtercake may be exposed to one or more breaker fluids to remove the viscosifier and the filtercake from the wellbore. Exposure of the viscosifier and the filtercake to the breaker fluid may hydrolyze may degrade the filtercake (e.g., such as by hydrolyzing one or more ether groups of the filtercake).

The breaker fluid may include one or more of an acid, an oxidizer, or a solvent. The acid may include one or more of a strong mineral acid (e.g., hydrochloric acid, sulfuric acid), organic acids (e.g., citric acid, salicyclic acid, lactic acid, malic acid, maleic acid, acetic acid, formic acid, glycolic acid, fumaric acid, and homo- or copolymers of lactic acid and glycolic acid.

The oxidizer may include one or more of ammonium persulfate, THBP, a peroxide, a hydrolysable esters of carboxylic acid, a hydrolysable phosphonic ester, or a hydrolysable sulfonic ester. By way of non-limiting example, the hydrolysable esters of carboxylic acid may include one or more of a $C_1$ to a $C_6$ carboxylic acid, a $C_3$ to $C_8$ of a dicarboxylic acid, a $C_2$ to $C_{30}$ mono- or poly-alcohol (including alkyl orthoesters). In some embodiments, the hydrolysable esters include about 57 weight percent to about 67 weight percent dimethyl glutarate, about 18 weight percent to about 28 weight percent dimethyl succinate, and 8 weight percent to about 22 weight percent dimethyl adipate. In other embodiments, the oxidizer comprises one or more of $R^1H_2PO_3$, $R^1R^2HPO_3$, $R^1R^2R^3PO_3$, $R^1HSO_3$, $R^1R^2SO_3$, $R^1H_2PO_4$, $R^1R^2HPO_4$, $R^1R^2R^3PO_4$, $R^1HSO_4$, or $R^1R^2SO_4$, where $R^1$, $R^2$ and $R^3$ are $C_2$ to $C_{30}$ alkyl-, aryl-, arylalkyl-, or alkylaryl-groups.

The breaker fluid may further comprise an oxidant formulated and configured to react with a polymer and disrupt the filtercake. The oxidant may include a bromates, peroxides (including peroxide adducts), other compounds including a peroxy bond such as persulfates, perborates, percarbonates, perphosphates, and persilicates, and other oxidizers such as hypochlorites. In one or more embodiments, the oxidant may be included in the breaker fluid in an amount from about 1 ppb to 10 ppb.

Figure 2:
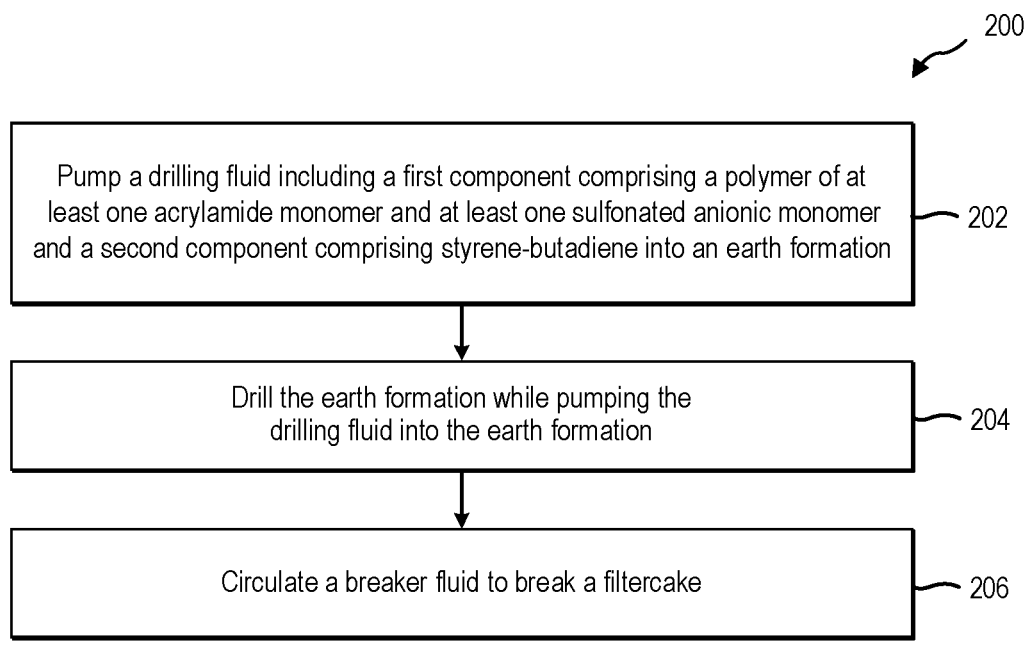
FIG. 2 is a simplified flow diagram illustrating a method of drilling a wellbore, according to at least one embodiment of the disclosure.

FIG. 2 is a simplified flow diagram illustrating a method 200 of operating a wellbore, according to at least one embodiment of the disclosure. The method 200 includes pumping a drilling fluid including a first component comprising a polymer of at least one acrylamide monomer and at least one sulfonated anionic monomer and a second component comprising styrene-butadiene an earth formation, as shown at act 202. The drilling fluid may include one or more of the drilling fluids described above and may include one or more of the viscosifiers described above. In some embodiments, the second component may be provided to the drilling fluid as a solid (e.g., a powder). For example, the second component may be mixed in the drilling fluid, such as at a mud pit.

The method 200 may further include drilling the earth formation while pumping the drilling fluid into the earth formation, as shown at act 204. In some embodiments, the drilling fluid is circulated through the drill string, out of the drill bit, and through the annulus between the drill string and the earth formation. The drilling fluid may facilitate removal of cuttings from the wellbore as the drilling fluid circulates through the wellbore.

In some embodiments, a filtercake is formed on surfaces of the earth formation defining the wellbore. The filtercake may be formed of and include the viscosifier described above. For example, the filtercake may be formed from the first component and the second component of the viscosifier.

The method 200 may further include circulating a breaker fluid to break a filtercake, as shown in act 206. The breaker fluid may include any of the breaker fluids previously described. Responsive to exposure to the breaker fluid, the filtercake may be degraded, facilitating removal of the filtercake, the viscosifier, and the drilling fluid remaining in the wellbore 102.

The viscosifiers described herein may be suitable for use in HTHP wellbores. The second component including the styrene-butadiene polymer in the viscosifier may facilitate stability of the viscosifier in high-salinity drilling fluids. In addition, the viscosifier may be stable at HTHP wellbore conditions. Advantageously, the viscosifier is suitable at HTHP conditions and in high-salinity drilling fluids, but is also easily broken responsive to exposure to the breaker fluid. For example, the viscosifiers may be used in drilling fluids including saturated brines.

In some embodiments, the viscosifiers are used in drilling fluids comprising at least about 10.0 weight percent salt, such as at least about 15.0 weight percent, at least about 20.0 weight percent, at least about 25.0 weight percent, or even at least about 30.0 weight percent salt. For example, the viscosifiers may be used in drilling fluids including brines having a weight percent of sodium chloride greater than about 10.0 weight percent, such as greater than about 15.0 weight percent, or greater than about 20.0 weight percent; brines having a weight percent of sodium bromide greater than about 20.0 weight percent, such as greater than about 30.0 weight percent, or greater than about 40.0 weight percent; or brines having a weight percent of potassium chloride greater than about 10.0 weight percent, such as greater than about 15.0 weight percent, or greater than about 20.0 weight percent. In some embodiments, the viscosifier may be used in brines having a salt weight percent greater than about 50 percent of a saturation weight percent, such as greater than about 60 weight percent, greater than about 70 weight percent, greater than about 80 weight percent, or even greater than about 90 weight percent of a saturation weight percent.

The embodiments of drilling fluids and the viscosifiers have been primarily described with reference to wellbore drilling operations; the drilling fluids and the viscosifiers described herein may be used in applications other than the drilling of a wellbore. In other embodiments, drilling fluids and viscosifiers according to the present disclosure may be used outside a wellbore or other downhole environment used for the exploration or production of natural resources. For instance, drilling fluids and viscosifiers of the present disclosure may be used in a borehole used for placement of utility lines. Accordingly, the terms "wellbore," "borehole" and the like should not be interpreted to limit tools, systems, assemblies, or methods of the present disclosure to any particular industry, field, or environment.

One or more specific embodiments of the present disclosure are described herein. These described embodiments are examples of the presently disclosed techniques. Additionally, in an effort to provide a concise description of these embodiments, not all features of an actual embodiment may be described in the specification. It should be appreciated that in the development of any such actual implementation, as in any engineering or design project, numerous embodiment-specific decisions will be made to achieve the developers' specific goals, such as compliance with system-related and business-related constraints, which may vary from one embodiment to another. Moreover, it should be appreciated that such a development effort might be complex and time consuming, but would nevertheless be a routine undertaking of design, fabrication, and manufacture for those of ordinary skill having the benefit of this disclosure.

Additionally, it should be understood that references to "one embodiment" or "an embodiment" of the present disclosure are not intended to be interpreted as excluding the existence of additional embodiments that also incorporate the recited features. For example, any element described in relation to an embodiment herein may be combinable with any element of any other embodiment described herein. Numbers, percentages, ratios, or other values stated herein are intended to include that value, and also other values that are "about" or "approximately" the stated value, as would be appreciated by one of ordinary skill in the art encompassed by embodiments of the present disclosure. A stated value should therefore be interpreted broadly enough to encompass values that are at least close enough to the stated value to perform a desired function or achieve a desired result. The stated values include at least the variation to be expected in a suitable manufacturing or production process, and may include values that are within 5%, within 1%, within 0.1%, or within 0.01% of a stated value.

A person having ordinary skill in the art should realize in view of the present disclosure that equivalent constructions do not depart from the spirit and scope of the present disclosure, and that various changes, substitutions, and alterations may be made to embodiments disclosed herein without departing from the spirit and scope of the present disclosure. Equivalent constructions, including functional "means-plus-function" clauses are intended to cover the structures described herein as performing the recited function, including both structural equivalents that operate in the same manner, and equivalent structures that provide the same function. It is the express intention of the applicant not to invoke means-plus-function or other functional claiming for any claim except for those in which the words 'means for' appear together with an associated function. Each addition, deletion, and modification to the embodiments that falls within the meaning and scope of the claims is to be embraced by the claims.

The terms "approximately," "about," and "substantially" as used herein represent an amount close to the stated amount that is within standard manufacturing or process tolerances, or which still performs a desired function or achieves a desired result. For example, the terms "approximately," "about," and "substantially" may refer to an amount that is within less than 5% of, within less than 1% of, within less than 0.1% of, and within less than 0.01% of a stated amount. Further, it should be understood that any directions or reference frames in the preceding description are merely relative directions or movements. For example, any references to "up" and "down" or "above" or "below" are merely descriptive of the relative position or movement of the related elements.

The present disclosure may be embodied in other specific forms without departing from its spirit or characteristics. The described embodiments are to be considered as illustrative and not restrictive. The scope of the disclosure is, therefore, indicated by the appended claims rather than by the foregoing description. Changes that come within the meaning and range of equivalency of the claims are to be embraced within their scope.

What is claimed:

1. A drilling fluid, comprising:
   water;
   salt; and
   a viscosifier comprising:
      a first component comprising a reaction product of at least one acrylamide monomer and at least one sulfonated anionic monomer; and
      a second component comprising styrene-butadiene polymer; wherein the first component further comprises a branching agent; wherein the branching agent may constitute from about 0.1 weight percent to about 5.0 weight percent of the first component.

2. The drilling fluid of claim 1, wherein the styrene-butadiene polymer comprises a ratio of styrene to butadiene within a range of from about 1.0:1.0 to about 5.0:1.0.

3. The drilling fluid of claim 1, wherein:
   the at least one acrylamide monomer comprises N,N-dimethylacrylamide; and
   the at least one sulfonated anionic monomer comprises 2-acrylamido-2-methyl-propanesulfonic acid.

4. The drilling fluid of claim 1, wherein the second component constitutes from about 0.5 weight percent to about 9.0 weight percent of the drilling fluid.

5. The drilling fluid of claim 1, wherein the drilling fluid comprises a greater weight percent of the reaction product of at least one acrylamide monomer and at least one sulfonated anionic monomer than of the styrene-butadiene polymer.

6. The drilling fluid of claim 1, wherein a ratio of the first component to the styrene-butadiene polymer is within a range of from about 0.67:1.0 to about 4.0:1.0.

7. The drilling fluid of claim 1, wherein the first component further comprises a branching agent comprising tetraallyl ammonium chloride.

8. The drilling fluid of claim 1, wherein the second component further comprises a surfactant.

9. The drilling fluid of claim 1, wherein the second component further comprises starch.

10. The drilling fluid of claim 1, wherein the at least one acrylamide monomer comprises acrylamide, methacrylamide, or an N-substituted acrylamide.

11. The drilling fluid of claim 1, wherein the salt is present in the drilling fluid at greater than about 50 percent of a saturation weight percent.

12. A method of operating a wellbore, the method comprising:
   pumping a drilling fluid into a wellbore extending through an earth formation, the drilling fluid comprising:
      a base fluid; and
      a viscosifier comprising:
         a first component comprising a reaction product of at least one acrylamide monomer and at least one sulfonated anionic monomer; and
         a second component comprising styrene-butadiene rubber; and
   operating a drill bit while pumping the drilling fluid in the wellbore; wherein the first component further comprises a branching agent; wherein the branching agent may constitute from about 0.1 weight percent to about 5.0 weight percent of the first component.

13. The method of claim 12, wherein pumping a drilling fluid through an earth formation comprises pumping the drilling fluid into an earth formation having a temperature greater than about 176.7° C. (about 400° F.).

14. The method of claim 12, wherein pumping a drilling fluid into a wellbore extending through an earth formation comprises pumping a drilling fluid comprising a viscosifier comprising a reaction product of N,N-dimethylacrylamide and 2-acrylamido-2-methyl-propanesulfonic acid into the wellbore.

15. The method of claim 12, wherein pumping a drilling fluid into a wellbore extending through an earth formation comprises pumping a drilling fluid comprising a greater concentration of the first component than the second component in the wellbore.

16. The method of claim 12, wherein pumping a drilling fluid into a wellbore extending through an earth formation comprises pumping a drilling fluid comprising a viscosifier further comprising a branching agent, comprising tetraallyl ammonium chloride, into the wellbore.

17. The method of claim 12, further comprising forming a filtercake on walls of the earth formation while operating the drill bit.

18. The method of claim 12, wherein pumping a drilling fluid into a wellbore comprises pumping a drilling fluid comprising brine comprising at least about 10.0 weight percent salt into the wellbore.

19. The method of claim 12, further comprising providing the second component to the viscosifier as a solid.

20. A drilling fluid, comprising:
   a base fluid comprising brine; and
   a viscosifier comprising:
      a first component comprising a reaction product of N,N-dimethylacrylamide and 2-acrylamido-2-methyl-propanesulfonic acid; and
      a second component comprising styrene-butadiene rubber; wherein the first component further comprises a branching agent; wherein the branching agent may constitute from about 0.1 weight percent to about 5.0 weight percent of the first component.

* * * * *